M. MICKELSON.
Wheels for Vehicles.

No. 150,773. Patented May 12, 1874.

Witnesses:

Inventor:
M. Mickelson
Per
Attorneys.

UNITED STATES PATENT OFFICE.

MICHAEL MICKELSON, OF ASHLAND, OREGON.

IMPROVEMENT IN WHEELS FOR VEHICLES.

Specification forming part of Letters Patent No. 150,773, dated May 12, 1874; application filed April 11, 1874.

*To all whom it may concern:*

Figure 1:
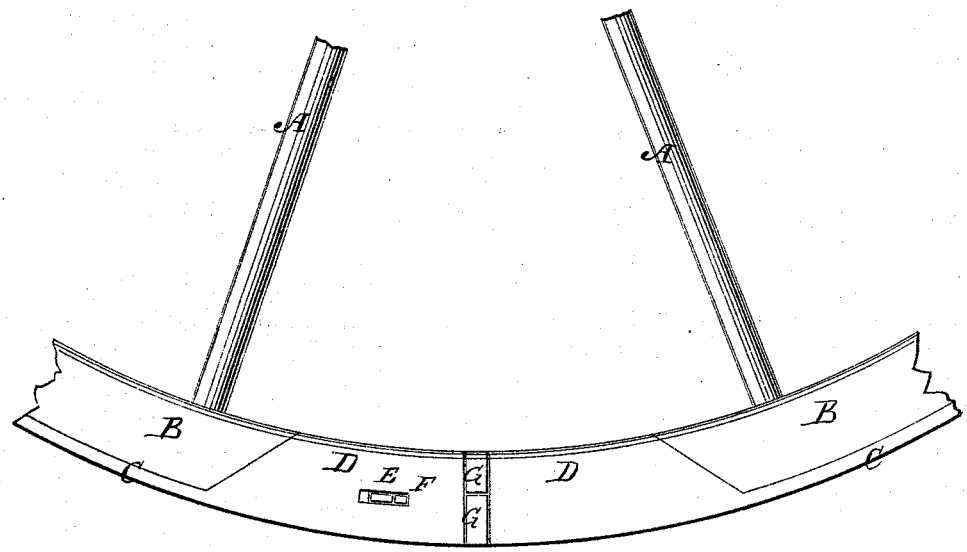
Figure 2:
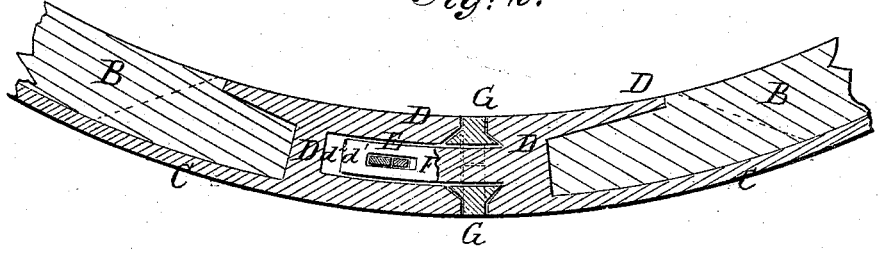
Figure 3:
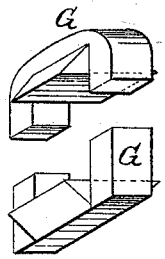

Be it known that I, MICHAEL MICKELSON, of Ashland, in the county of Jackson and State of Oregon, have invented a new and useful Improvement in Vehicle-Wheel, of which the following is a specification:

Figure 1 is a side view of a portion of a wagon-wheel illustrating my improvement. Fig. 2 is a detail section of the same. Fig. 3 is a perspective view of the detachable caps.

Similar letters of reference indicate corresponding parts.

My invention has for its object to furnish an improved vehicle-wheel, which shall be so constructed that the tire may be tightened without removing it from the wheel, and which shall be convenient in use and reliable in operation.

The invention consists in the pieces or caps in combination with the tongue-and-socket blocks formed upon the ends of a cut tire, and with the wedge or key that draws said ends together, as hereinafter fully described.

A represents the spokes. B represents the fellies, and C the tire, of a wheel. The tire C is open, and upon its ends are formed blocks D, which enter a space formed by cutting off a portion from the continuous ends of two adjacent fellies, B. In the inner ends of the blocks D are formed sockets, to receive and fit upon the ends of the fellies B. Upon the outer end of one of the blocks D is formed a long bolt or tongue, $d^1$, which enters and fits into a corresponding socket, $d^2$, formed in the outer end of the other block D, where it is secured in place by a wedge or key, E, passing through a slot in said block and tongue, which key rests against a washer, F, also inserted in said slot. The space between the ends of the blocks D is filled by the U-shaped caps G, each being of such a size as to pass half around the rim of the wheel, as shown in Figs. 1, 2, and 3. Upon the side edges of the middle parts of the caps or pieces G are formed beveled flanges, which fit into bevels in the edges of the blocks D, and thus dovetail the said caps G into their places, as shown in Figs. 2 and 3. When the tire is to be tightened the caps G are removed and left out, or replaced with narrower ones, according to the amount of tightening to be done, and a broader wedge or key, E, is driven into the slot in the block and tongue. When the key E is driven home its ends are cut off flush with the sides of the block D in such a way that its edges may overlap the edges of the slot to prevent it from working out.

Having thus described my invention, I claim as new and desire to secure by Letters Patent—

The detachable caps or pieces G in combination with the tongue-and-socket blocks D, formed upon the ends of a cut tire, and with the key E, substantially as shown and described.

MICHAEL MICKELSON.

Witnesses:
W. D. STEARNS,
E. DE PEATT.